Patented Oct. 31, 1922.

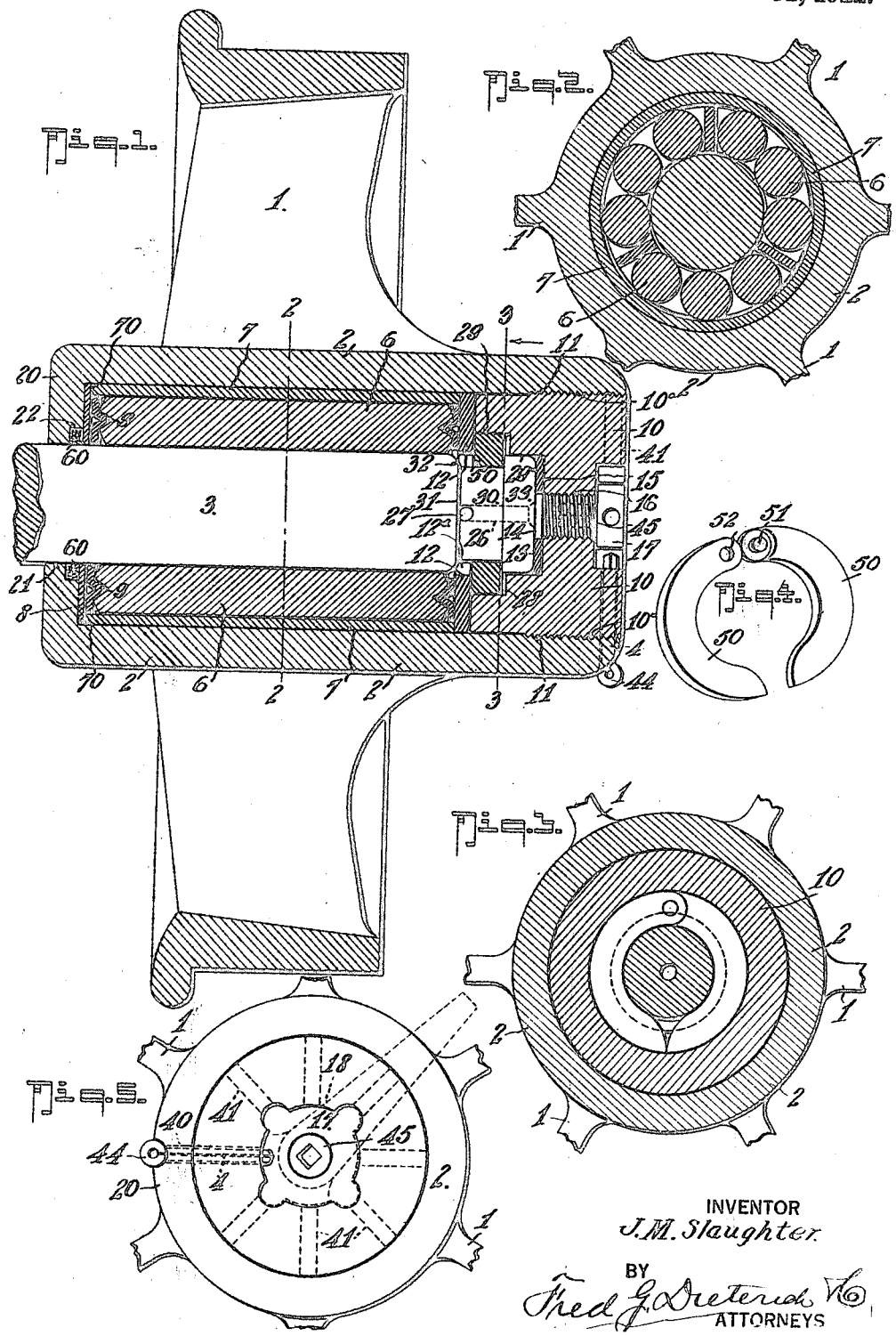

1,434,233

UNITED STATES PATENT OFFICE.

JAMES MONROE SLAUGHTER, OF CHATTANOOGA, TENNESSEE.

SELF-LUBRICATING CAR WHEEL.

Application filed July 26, 1921. Serial No. 487,754.

*To all whom it may concern:*

Be it known that I, JAMES M. SLAUGHTER, a citizen of the United States, residing at Chattanooga, in the county of Hamilton and State of Tennessee, have invented certain new and useful Improvements in Self-Lubricating Car Wheels, of which the following is a specification.

My present invention, which has reference generally to improvements in self-lubricating car wheels, more specifically relates to improvements on that type of self-lubricating car wheel disclosed in my Patent #1,226,127, dated May 15, 1917, and primarily my present invention seeks to provide an improved construction of wheel of the type stated in which the bushing elements are especially designed for being applied in the outer end of the wheel hub, in connection with roller bearings mounted within and lengthwise of the hub and between which the wheel axle is mounted, the said bushing elements and the means for sustaining the same in cooperative arrangement with the axle and the roller bearings having such form and adapted for being operatively so combined that the said parts can be quickly and conveniently assembled for use and the said bushing elements held practically dirt and dust proof.

Another object of my invention is the provision of a bushing especially designed for the convenient application of the lubricant over the parts within the hollow hub of the wheel, means being included for locking the bushing to its adjusted or wheel applied position and for the convenient application of an unlocking lever when it is desired to disassemble the parts.

Again, my present invention has for its purpose to provide certain improvements on that type of self-lubricating car wheels, before mentioned, in which is included a simplified, easily applied and effective means for locking the axle against end thrusts, relatively to the wheel and the bushing elements, means being also included, in the nature of improved end rings, for holding the roller bearings in proper relation with respect to the vehicle hub and the axle, the said rings, the bushing elements and the axle locking devices being especially designed to permit of a free distribution of the lubricant to the engaging portions of the said operating parts, provision being also provided for conveniently supplying the lubricant to the outer end of the hub, for keeping the lubricant from escaping from the hub and for holding the same dust and water proof.

With other objects in view, that will hereinafter appear, my present construction of self-lubricating car wheel embodies the peculiar features and novel combination of parts fully explained in the following detailed description, specifically mentioned in the appended claims, and illustrated in the accompanying drawing, in which:

Figure 1 is a horizontal section of a roller bearing car wheel with my improvements applied.

Figure 2 is a transverse section thereof taken on the line 2—2 of Figure 1.

Figure 3 is a cross section taken along the line 3—3 on Figure 1, looking in the direction of the arrow.

Figure 4 is a perspective view of the axle locking members or keepers.

Figure 5 is a face view of the bushing member in place on the wheel hub.

In the drawing, in which like numerals indicate like parts in all of the figures, 1 designates the car wheel, 2 the hub thereof, into which the end of the axle 3 is projected and which hub, in my present construction, has its inner end closed by a front portion 20, which is an integral part of the hub and has a central aperture 21 for the free passage of the axle 3.

The inner face of the end portion 20 of the hub has an annular groove 22 that surrounds the axle passage 21 in which is seated a felt washer 60 that is held in place by a drive fit disk washer 8.

7 designates a housing or liner that fits snugly within the hub, as is best shown in Figure 1, by reference to which it will be noticed the liner 7 is of a length slightly greater than that of the long bearing rollers 6 that seat around the axle 3 and ride on the liner 7. The rollers 6 are kept in place by steel end rings 9—9 that loosely slip into the projected ends 70 of the liner 7 and tightly engage the axle 3, the said rings constituting keepers for holding the set of rollers 6 in proper alignment and against longitudinal displacement.

The bushing 10, in my present invention, is in the nature of a solid cap that is externally threaded from its outer to near its inner end, as indicated by 10ª, for threading into the internally threaded surface 11 of the outer end of the hub, the said bushing having a portion of its periphery, at the inner end thereof, smooth to provide for a smooth fit of the cap along the inner straight surface of the hub cavity, as shown.

To provide a positive closure for the engaging ends of the liner 7, the corresponding ends of the rollers 6 and the cooperating keeper rings that engage the said rollers 6 and the liner ends, a relatively heavy steel closing washer 12 snugly fits the internal bore of the hub. The washer 12 has a central aperture 12$^a$ of larger diameter than the reduced or neck portion 30 of the axle to provide for the free distribution of the lubricant to the axle and its roller bearings 6, and to further facilitate the flow of the lubricant the outer shoulder 31 of the axle 3 is rounded at 32, as shown.

The closure washer 12 is tightly held up against the housing or liner 7 by the proper inward adjustment of the bushing 10, the inner face of which bears firmly against the said washer 12, thus forming a chamber for rollers 6 and end rings 9, the rollers 6 being made convex to minimize friction against end rings when coming in contact at either end.

The axle 3, in my present construction of parts, has a combined locking and thrust head 33 at the outer end that engages a brass end thrust washer 13, formed with a central opening 14, the purpose of which is apparent from the drawing, and the said washer 13 fits a recessed seat 15 in the bushing around a threaded aperture 16 in the said bushing which opens into a non-circular socket 17 adapted for receiving the head 18 of an unlocking lever, as indicated in dotted lines on Figure 5.

4 designates a cotter pin and 40—41 transverse apertures in the outer end of the hub and the corresponding end of the bushing cap, the said apertures being so positioned that the cotter pin may be readily fitted in place through the socket 17 in the end of the hub. 44 designates the cotter pin head for holding it in place and 45 indicates a threaded closure plug that is screwed into the aperture 16 after the lubricant has been fed therethrough.

The outer end of the axle has a longitudinal channel 26 which extends back and communicates with a cross passage 27 that opens at the opposite end into a lubricant reservoir 28 formed between the axle locking fingers or keepers or half ring sections 50—50 and the shoulder or neck portion of axle 31 and 32.

The inner end of the bushing is hollowed and has an annular straight seat 29 into which is received the axle locking keepers presently explained, and a concaved portion 29$^a$ which merges with the seat 15 and in which fits the head 33 of the axle.

The locking devices for securing the axle against longitudinal displacement relatively to the hub, in my present construction are shaped as is shown in detail in Figure 4, and such devices consist of an opposing pair of half ring sections 50—50, one of which has a hinge pin 51 and the other has its hinge head portion provided with an aperture 52 for slipping onto the pin 51, the hinge end of the said devices being such that in fitting the parts the said ring sections 50—50 may be readily slipped onto the neck of the axle between the axle head 33 and the washer 12, the ring sections 50—50 which fit around the axle neck being securely held in place between the axle head and the washer 12 by the straightway internal portion of the bushing cavity, as clearly shown in Figure 1.

From the foregoing description taken in connection with the accompanying drawing the complete construction, the manner of assembling the several parts to their cooperative position and the advantages of my improvements will be readily apparent to those familiar with car wheel structures of the kind to which my said invention may relate. In my present construction, the lubricant can be readily supplied through the central aperture in the bushing when the plug 16 therein is removed and caused to be forced through the central channel in the axle end and out through the transverse passage in communication with the said channel and which discharges at the opposite ends into the reservoir space between the axle shoulder, the locking devices 50—50 and the axle head.

In my construction of bushing its formation is such that there is no wear on the outer end thereof and since the end thrust or rubbing of the axle is taken up by the washer 13, the bushing is practically wearproof, since when the washer wears down it can be readily replaced by a new one.

What I claim is:

1. In a car wheel having a hub open at the outer end and an inturned closing flange at the inner end, the combination with the axle having a locking neck at the outer end, roller bearings within the axle hub engaging the axle and means for holding the said bearings from endwise movement, a locking means independent of the axle insertable through the open end of the hub to fit around the locking neck of the axle, and a bushing insertable into the said open end of the hub and adapted for holding the locking elements to their axle engaging position, and means for holding the bushing to its adjusted positions within the axle hub.

2. As an improvement in car wheels, the combination with the wheel hub having an axle passage in its inner end and an outer open end, the front end having a washer receiving seat on its inner side surrounding the axle passage, a washer of yieldable material fitting such seat, a drive fit steel washer engaging the inner face of the hub portion and the yieldable washer, a liner sleeve within the hub the inner edge of which engages the drive fit steel washer, a series of longitudinally extended roller bearings engaging the axle and the liner sleeve, the said bearings being of slightly less length than the liner sleeve, a ring at each end of the roller bearings that fit around the axle and are held within the adjacent extended ends of the liner sleeve, said rings constituting keepers for engaging the ends of the series of roller bearings, the axle having a locking neck located beyond the outer ends of the roller bearings, locking devices insertable through the open end of the wheel hub for engaging the axle neck, and a bushing engaging the open end of the hub for closing such end, and for holding the internal elements seated to their cooperative adjustments, and means for securing the bushing at its adjustments.

3. As an improvement in car wheels, the combination with the wheel hub having an axle passage in its inner end and an outer open end, the front end having a washer receiving seat on its inner side surrounding the axle passage, a washer of yieldable material fitting such seat, a drive fit steel washer engaging the inner face of the hub front, and the yieldable washer, a liner sleeve within the hub, the inner edge of which engages the drive fit steel washer, a series of longitudinally extended roller bearings engaging the axle and the liner sleeve, the said bearings being of slightly less length than the liner sleeve, a ring at each end of the roller bearings that fit around the axle and are held within their adjacent extended ends of the liner sleeve, said rings constituting keepers for engaging the ends of the series of roller bearings, the axle having a locking neck located beyond the outer ends of the roller bearings, locking devices insertable through the open end of the wheel hub for engaging the axle neck, and a bushing engaging the open end of the hub for closing such end, and for holding the internal elements stated to their cooperative adjustments, means for securing the bushing at its adjustments, the said means comprising a hub portion having a radial aperture, a central socket formed in the outer face of the bushing and radial apertures in the bushing that extend from the central socket to the periphery thereof, and adapted for being moved into register with the radial aperture in the hub and a cotter pin device for locking the bushing to the hub.

4. In a car wheel, the combination of an axle, longitudinally disposed roller bearings within the wheel hub engaging the axle portion within the said hub, the said axle having its outer end extended beyond the said roller bearings and formed with a locking neck, a thrust washer loosely mounted in the hub to engage and form a closure for the outer ends for the roller bearings, locking devices insertable through the open end of the hub adapted for being slipped over the axle neck, and a bushing insertable into the open end of the hub, the said bushing having an annular bearing flange for engaging the thrust washer and socketed for holding the locking devices in operative position, and means for holding the bushing to its hub infed position.

5. In a car wheel, the combination of an axle, longitudinally disposed roller bearings within the wheel hub engaging the axle portion within the said hub, the said axle having its outer end extended beyond the said roller bearings and formed with a locking neck, a thrust washer loosely mounted in the hub to engage and form a closure for the outer ends for the roller bearings, locking devices insertable through the open end of the hub adapted for being slipped over the axle neck, a bushing insertable into the open end of the hub, the said bushing having an annular bearing flange for engaging the thrust washer and socketed for holding the locking devices in operative position, means for holding the bushing to its hub infed position, the said bushing having an internal seat portion and an end thrust washer fitting said seat portion and adapted for being engaged by the head end of the axle.

6. In a car wheel, the combination of an axle, longitudinally disposed roller bearings within the wheel hub engaging the axle portion within the said hub, the said axle having its outer end extended beyond the said roller bearings and formed with a locking neck, a thrust washer loosely mounted in the hub to engage and form a closure for the outer ends for the roller bearings, locking devices insertable through the open end of the hub adapted for being slipped over the axle neck, and a bushing insertable into the open end of the hub, the said bushing having an annular bearing flange for engaging the thrust washer and socketed for holding the locking devices in operative position, means for holding the bushing to its hub infed position, the said locking devices comprising a pair of opposing hingedly connected half ring members adapted for encircling the said axle neck and for being held between the axle head and the end thrust or closure washer that engages the outer end of the roller bearings.

7. In a car wheel, the combination of an axle, longitudinally disposed roller bearings within the wheel hub engaging the axle portion within the said hub, the said axle having its outer end extended beyond the said roller bearings and formed with a locking neck, a thrust washer loosely mounted in the hub to engage and form a closure for the outer ends for the roller bearings, locking devices insertable through the open end of the hub adapted for being slipped over the axle neck, and a bushing insertable into the open end of the hub, the said bushing having an annular bearing flange for engaging the thrust washer and socketed for holding the locking devices in operative position, means for holding the bushing to its hub infed position, the said locking devices comprising a pair of opposing hingedly connected half ring members adapted for encircling the said axle neck and for being held between the axle head and the end thrust or closure washer that engages the outer end of the roller bearings, the said axle having a longitudinal lubricant receiving channel in its outer end and a transverse passage in communication with said channel and opening into the hub cavity, the said bushing having an oil supply aperture through its outer face and a plug for closing the said opening.

8. In a car wheel, the combination of an axle, longitudinally disposed roller bearings within the wheel hub engaging the axle portion within the said hub, the said axle having its outer end extended beyond the said roller bearings and formed with a locking neck, a thrust washer loosely mounted in the hub to engage and form a closure for the outer ends for the roller bearings, locking devices insertable through the open end of the hub adapted for being slipped over the axle neck, and a bushing insertable into the open end of the hub, the said bushing having an annular bearing flange for engaging the thrust washer and socketed for holding the locking devices in operative position, means for holding the bushing to its hub infed position, the said locking devices comprising a pair of opposing hingedly connected half ring members adapted for encircling the said axle neck and for being held between the axle head and the end thrust or closure washer that engages the outer end of the roller bearings, the said axle having a longitudinal lubricant receiving channel in its outer end, and a transverse passage in communication with said channel and opening into the hub cavity, the said bushing having an oil supply aperture through its outer face and a plug for closing the said aperture, the said hub and the bushing having cooperating engaging shouldered surfaces, the bushing having a non-circular socket in the outer face for receiving a turning tool, and means for locking the bushing to its threaded adjustments within the wheel hub.

9. In a wheel of the character described, a hub having an axle passage at the inner end and a straight way cavity that opens through the outer end in combination with an axle that extends through the passage in the inner hub end, a series of longitudinal roller bearings within the hub with which the axle engages, the front end of the axle extending beyond the roller bearings and provided with a locking neck and a head, a thrust washer that is slidable into the hub cavity to engage with the outer ends of the roller bearings, a locking device comprising two hingedly joined half ring sections adapted for being passed into the open end of the hub and fitted around the axle neck between the axle head and the thrust washer that engages the ends of the roller bearings, a bushing cap that is adjustable into the hub cavity and including an annular flange for engaging the thrust washer and which serves as a keeper for holding the locking ring onto the axle neck, the said bushing cap having a central oil passage, the adjacent head end of the axle having a longitudinal oil receiving channel and a lateral communicating with said channel that distributes the oil through the axle neck into the hub cavity between the adjacent shouldered end of the axle and the locking ring, a plug normally closing the oil passage through the bushing, and means for holding the said bushing to its inwardly adjusted position.

10. In a car wheel of the character stated, the combination with the wheel hub and an axle, bearings within the wheel hub for the axle, the said axle having its outer end projected beyond the said bearings, an annular thrust member engaging the outer ends of the said bearings, the projected end of the axle having a reduced or neck portion and a head, locking half rings insertable through the open end of the hub, and adapted for being dropped around the axle neck between the axle head and the thrust member, a bushing, said bushing and the outer end of the hub cavity having interengaging threaded portions, the bushing having an inner flanged end for fitting over the lock rings and for engaging the annular thrust member, said bushing having a central oil passage and a closure plug therefor, the head end of the axle having a longitudinal oil channel and a liner from said channel that opens through the axle into the hub cavity, and means for holding the bushing locked to its adjusted positions.

JAMES MONROE SLAUGHTER.